(12) United States Patent
Switkes et al.

(10) Patent No.: US 10,162,366 B2
(45) Date of Patent: *Dec. 25, 2018

(54) METHODS AND SYSTEMS FOR SEMI-AUTONOMOUS VEHICULAR CONVOYS

(71) Applicant: Peloton Technology, Inc., Mountain View, CA (US)

(72) Inventors: Joshua P. Switkes, Mountain View, CA (US); Joseph Christian Gerdes, Los Altos, CA (US)

(73) Assignee: Peloton Technology, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/028,307

(22) Filed: Jul. 5, 2018

(65) Prior Publication Data

US 2018/0314267 A1    Nov. 1, 2018

Related U.S. Application Data

(60) Continuation of application No. 15/817,038, filed on Nov. 17, 2017, now Pat. No. 10,042,365, which is a
(Continued)

(51) Int. Cl.
*G05D 1/02* (2006.01)
*G08G 1/00* (2006.01)
(Continued)

(52) U.S. Cl.
CPC .......... *G05D 1/0295* (2013.01); *G01C 22/00* (2013.01); *G01S 13/931* (2013.01);
(Continued)

(58) Field of Classification Search
CPC .......... G08G 1/166; G08G 1/202; G08G 1/22; G08G 1/167; G05D 1/0295; G05D 1/0217;
(Continued)

(56) References Cited

U.S. PATENT DOCUMENTS 5,331,561 A     7/1994    Barrett et al.
5,680,122 A    10/1997    Mio
(Continued)

FOREIGN PATENT DOCUMENTS

EP    0991046 B1    3/2005
EP    2390744 A1    11/2011
(Continued)

OTHER PUBLICATIONS

Browand, Fred et al., "Fuel Saving Achieved in the Field Test of Two Tandem Truck," California PATH Research Report UCB-ITS-PRR-2004-20, Jun. 2004, 29 pages.
(Continued)

*Primary Examiner* — Tyler J Lee
(74) *Attorney, Agent, or Firm* — Carlos J. Rosario

(57) ABSTRACT

The present invention relates to a method and system for enabling vehicles to closely follow one another through partial automation. Following closely behind another vehicle can have significant fuel savings benefits, but is unsafe when done manually by the driver. By directly commanding the engine torque and braking of the following vehicle while controlling the gap between vehicles using a sensor system, and additionally using a communication link between vehicles that allows information about vehicle actions, such as braking events, to be anticipated by the following vehicle, a Semi-Autonomous Vehicular Convoying System that enables vehicles to follow closely together in a safe, efficient and convenient manner may be achieved.

30 Claims, 14 Drawing Sheets

Related U.S. Application Data continuation of application No. 15/607,316, filed on May 26, 2017, which is a continuation of application No. 14/292,583, filed on May 30, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006.

(60) Provisional application No. 61/505,076, filed on Jul. 6, 2011.

(51) Int. Cl.
| | |
|---|---|
| *G01C 23/00* | (2006.01) |
| *G01S 13/93* | (2006.01) |
| *G01C 22/00* | (2006.01) |
| *G08G 1/16* | (2006.01) |
| *G01S 13/92* | (2006.01) |

(52) U.S. Cl.
CPC ......... *G05D 1/0217* (2013.01); *G05D 1/0293* (2013.01); *G05D 1/0297* (2013.01); *G08G 1/166* (2013.01); *G08G 1/167* (2013.01); *G08G 1/202* (2013.01); *G08G 1/22* (2013.01); *G01C 23/00* (2013.01); *G01S 13/92* (2013.01); *G01S 13/93* (2013.01); *G05D 2201/0213* (2013.01)

(58) Field of Classification Search
CPC ............... G05D 1/0293; G05D 1/0297; G05D 2201/0213; G01C 22/00; G01C 23/00; G01S 13/931; G01S 13/93; G01S 13/92
See application file for complete search history.

(56) References Cited

U.S. PATENT DOCUMENTS

| | | | |
|---|---|---|---|
| 6,032,097 A | 2/2000 | Iihoshi et al. | |
| 6,128,559 A | 10/2000 | Saitou et al. | |
| 6,356,820 B1 | 3/2002 | Hashimoto et al. | |
| 6,484,078 B1 | 11/2002 | Kageyama | |
| 6,510,381 B2 | 1/2003 | Grounds et al. | |
| 6,879,910 B2 | 4/2005 | Shike et al. | |
| 6,963,795 B2 | 11/2005 | Haissig et al. | |
| 7,286,825 B2 | 10/2007 | Shishido et al. | |
| 7,554,435 B2 | 6/2009 | Tengler et al. | |
| 7,593,811 B2 | 9/2009 | Schmidt et al. | |
| 7,729,823 B2 | 6/2010 | Ruoppolo | |
| 7,894,982 B2 | 2/2011 | Reeser et al. | |
| 8,026,833 B2 | 9/2011 | Villaume et al. | |
| 8,090,517 B2* | 1/2012 | Kobayashi | B60K 31/0008 701/94 |
| 8,116,921 B2 | 2/2012 | Ferrin et al. | |
| 8,139,109 B2 | 3/2012 | Schmiedel et al. | |
| 8,224,551 B2 | 7/2012 | Grolle et al. | |
| 8,275,491 B2 | 9/2012 | Ferrin et al. | |
| 8,326,473 B2 | 12/2012 | Simpson et al. | |
| 8,352,111 B2 | 1/2013 | Mudalige | |
| 8,442,735 B2 | 5/2013 | Hrovat et al. | |
| 8,538,656 B2 | 9/2013 | Yamashiro | |
| 8,676,466 B2 | 3/2014 | Mudalige | |
| 8,688,349 B2 | 4/2014 | Grolle et al. | |
| 8,738,238 B2 | 5/2014 | Rekow | |
| 8,947,531 B2 | 2/2015 | Fischer et al. | |
| 9,079,587 B1 | 7/2015 | Rupp et al. | |
| 9,145,137 B2 | 9/2015 | Doi et al. | |
| 9,423,794 B2 | 8/2016 | Lind et al. | |
| 2002/0077748 A1 | 6/2002 | Nakano | |
| 2006/0074557 A1 | 4/2006 | Mulligan et al. | |
| 2006/0095195 A1 | 5/2006 | Nishimura et al. | |
| 2006/0106534 A1 | 5/2006 | Kawamata et al. | |
| 2006/0161341 A1 | 7/2006 | Haegebarth et al. | |
| 2006/0229804 A1 | 10/2006 | Schmidt et al. | |
| 2007/0027614 A1 | 2/2007 | Reeser et al. | |
| 2007/0060045 A1 | 3/2007 | Prautzsch | |
| 2007/0233337 A1 | 10/2007 | Plishner | |
| 2007/0276597 A1 | 11/2007 | Kato et al. | |
| 2008/0009985 A1 | 1/2008 | Plishner | |
| 2008/0059007 A1 | 3/2008 | Whittaker et al. | |
| 2009/0012666 A1 | 1/2009 | Simpson et al. | |
| 2009/0062974 A1 | 3/2009 | Tarnamoto et al. | |
| 2009/0079839 A1 | 3/2009 | Fischer et al. | |
| 2009/0157461 A1 | 6/2009 | Wright et al. | |
| 2009/0164082 A1* | 6/2009 | Kobayashi | B60K 31/0008 701/94 |
| 2009/0222186 A1 | 9/2009 | Jensen | |
| 2010/0049374 A1 | 2/2010 | Ferrin et al. | |
| 2010/0250088 A1 | 9/2010 | Grolle et al. | |
| 2010/0256836 A1 | 10/2010 | Mudalige | |
| 2010/0256852 A1 | 10/2010 | Mudalige | |
| 2010/0332101 A1 | 12/2010 | Braunberger et al. | |
| 2011/0010022 A1 | 1/2011 | Beavin | |
| 2011/0112730 A1 | 5/2011 | Rekow | |
| 2011/0184605 A1 | 7/2011 | Neff | |
| 2011/0222730 A1 | 9/2011 | Steinberg et al. | |
| 2011/0270514 A1 | 11/2011 | Shida | |
| 2011/0270520 A1 | 11/2011 | Kronenberg | |
| 2012/0259516 A1 | 10/2012 | Grolle et al. | |
| 2013/0024084 A1 | 1/2013 | Yamashiro | |
| 2013/0030606 A1 | 1/2013 | Mudalige et al. | |
| 2013/0080041 A1 | 3/2013 | Kumabe | |
| 2013/0211624 A1 | 8/2013 | Lind et al. | |
| 2013/0317676 A1 | 11/2013 | Cooper et al. | |
| 2014/0303870 A1 | 10/2014 | Switkes et al. | |
| 2014/0309836 A1 | 10/2014 | Ollis | |
| 2015/0153733 A1 | 6/2015 | Ohmura et al. | |
| 2016/0267796 A1 | 9/2016 | Hiroma et al. | |

FOREIGN PATENT DOCUMENTS

| | | |
|---|---|---|
| JP | 5170008 B2 | 7/1993 |
| JP | 2995970 B2 | 12/1999 |
| JP | 2010030525 A | 2/2010 |
| JP | 5141849 B2 | 2/2013 |
| WO | 2004077378 A1 | 9/2004 |
| WO | 2011125193 A1 | 10/2011 |
| WO | 2013006826 A2 | 1/2013 |
| WO | 2015047174 A1 | 4/2015 |

OTHER PUBLICATIONS

Dejardins, Charles, et al., "Cooperative Adaptive Cruise Control: A Reinforcement Learning Approach," IEEE Transactions on Intelligent Transportation Systems, vol. 12, No. 4, pp. 1248-1260, Dec. 2011.

Friedrichs, Andreas et al., "A Generic Software Architecture for a Driver Information System to Organize and Operate Truck Platoons," Conference Paper—May 2008, pp. 250-259.

Korean Intellectual Property Office, ISA, "International Search Report and Written Opinion" in PCT Application No. PCT/US2012/045830, dated Jan. 7, 2013, 9 pages.

Michaelian, Mark, et al., "Field Experiments Demonstrate Fuel Savings for Close-Following," California PATH Research Report UCB-ITS-PRR-2000-14, 28 pages, Sep. 2000.

Nowakowski, Christopher, et al., "Cooperative Adaptive Cruise Control: Testing Drivers' Choices of Following Distances," California PATH Research Report UCB-ITS-PRR-2011-01, 171 pages, Jan. 2011.

Porche, Isaac R., et al., "Real Time Task Manager for Communications and Control in Multicar Platoons," Proceedings fo the Intelligent Vehicles '92 Symposium, pp. 409-414, Jun. 29-Jul. 1, 1992.

U.S. Appl. No. 61/167,121, filed Apr. 6, 2009 (Mudalige).

Ramakers, Richard et al., "Electronically coupled truck platoons on German highways," Proceedings of the 2009 IEEE International Conference on Systems, Man, and Cybernetics, San Antonio, TX, USA—Oct. 2009, pp. 2409-2414.

Sheikholeslam, Shahab, et al., "A System Level Study of the Longitudinal Control of a Platoon of Vehicles," Transactions of the ASME, vol. 114, pp. 286-292, Jun. 1992.

(56) References Cited

OTHER PUBLICATIONS

Sheikholeslam, Shahab, et al., "Longitudinal Control of a Platoon of Vehicles," Proceedings of the American Control Conference, May 23-25, 1990, pp. 291-296.

Sheikholeslam, Shahab, et al., "Longitudinal Control of a Platoon of Vehicles; III: Nonlinear Model," UCB PATH Report UCB-ITS-PRR-90-1, 25 pages, Apr. 1990.

Shladover, Steven E., "Development and Evaluation of Selected Mobility Applications for VII (a.k.a. IntelliDrive)," California PATH PowerPoint Presentation; available at http://slideplayer.com/slide/6981587/, Jul. 1, 2009; 17 pages.

Shladover, Steven E., et al., "Demonstration of Automated Heavy-Duty Vehicles," California PATH Research Report UCB-ITS-PRR-2005-23, Jun. 2005, 459 pages.

Sugimachi, Toshiyuki et al., "Development of Autonomous Platooning System for Heavy-duty Trucks," Proceedings of the 7th IFAC Symposium on Advances in Automotive Control, The International Federation of Automatic Control, Sep. 4-7, 2013. Tokyo, Japan, IFAC Proceedings Volumes vol. 46, Issue 21, (2013) pp. 52-57.

Tsugawa, Sadayuki, "An Overview on an Automated Truck Platoon within the Energy ITS Project," Proceedings of the 7th IFAC Symposium on Advances in Automotive Control, The International Federation of Automatic Control, Sep. 4-7, 2013. Tokyo, Japan, IFAC Proceedings Volumes vol. 46, Issue 21, (2013) pp. 41-46.

Tsugawa, Sadayuki, et al., "An Automated Truck Platoon for Energy Saving," 2011 IEEE/RSJ International Cnference on Intelligent Robots and Systems, pp. 4109-4114, Sep. 25-30, 2011.

Zabat, Michael et al., "The Aerodynamic Performance of Platoons: Final Report," California PATH Research Report UCB-ITS-PRR-95-35, 172 pages, Oct. 1995.

\* cited by examiner

METHODS AND SYSTEMS FOR SEMI-AUTONOMOUS VEHICULAR CONVOYS

CROSS REFERENCE TO RELATED APPLICATIONS

This application is a continuation of U.S. application Ser. No. 15/817,038, filed Nov. 17, 2017, which is a continuation of U.S. application Ser. No. 15/607,316, filed May 26, 2017, which is a continuation of U.S. application Ser. No. 14/292,583, filed May 30, 2014, now U.S. Pat. No. 9,665,102, which is a division of U.S. patent application Ser. No. 13/542,622, filed Jul. 5, 2012, now U.S. Pat. No. 8,744,666, all of which are entitled "Systems and Methods for Semi-Autonomous Vehicular Convoys" and are incorporated by reference herein in their entirety for all purposes.

Additionally, U.S. patent application Ser. No. 13/542,622 claims the benefit of U.S. Prov. Appn. Ser. No. 61/505,076, filed on Jul. 6, 2011, which is entitled "Systems and Methods for Semi-Autonomous Vehicular Convoying" and is incorporated by reference herein in its entirety for all purposes.

Additionally, U.S. application Ser. No. 14/292,583 is a division of U.S. patent application Ser. No. 13/542,627, filed Jul. 5, 2012, now U.S. Pat. No. 9,582,006, entitled "Systems and Methods for Semi-Autonomous Convoying of Vehicles", which is incorporated by reference herein in its entirety for all purposes, and which in turn also claims the benefit of U.S. Prov. Appn. Ser. No. 61/505,076, filed on Jul. 6, 2011.

BACKGROUND

The present invention relates to systems and methods for enabling vehicles to closely follow one another through partial automation. Following closely behind another vehicle has significant fuel savings benefits, but is generally unsafe when done manually by the driver. On the opposite end of the spectrum, fully autonomous solutions require inordinate amounts of technology, and a level of robustness that is currently not cost effective.

Currently the longitudinal motion of vehicles is controlled during normal driving either manually or by convenience systems, and during rare emergencies it may be controlled by active safety systems.

Convenience systems, such as adaptive cruise control, control the speed of the vehicle to make it more pleasurable or relaxing for the driver, by partially automating the driving task. These systems use range sensors and vehicle sensors to then control the speed to maintain a constant headway to the leading vehicle. In general these systems provide zero added safety, and do not have full control authority over the vehicle (in terms of being able to fully brake or accelerate) but they do make the driving task easier, which is welcomed by the driver.

Some safety systems try to actively prevent accidents, by braking the vehicle automatically (without driver input), or assisting the driver in braking the vehicle, to avoid a collision. These systems generally add zero convenience, and are only used in emergency situations, but they are able to fully control the longitudinal motion of the vehicle.

Manual control by a driver is lacking in capability compared to even the current systems, in several ways. First, a manual driver cannot safely maintain a close following distance. In fact, the types of distance to get any measurable gain results in an unsafe condition, risking a costly and destructive accident. Second, the manual driver is not as reliable at maintaining a constant headway as an automated system. Third, a manual driver when trying to maintain a constant headway has rapid and large changes in command (accelerator pedal position for example) that result in a loss of efficiency.

The system described here combines the components to attain the best attributes of the state of the art convenience and safety systems and manual control. By using the components and communication for the very best safety systems, together with an enhanced version of the functionality for convenience systems, together with the features and functionality of a manually controlled vehicle, the current solution provides a safe, efficient convoying solution.

It is therefore apparent that an urgent need exists for reliable and economical Semi-Autonomous Vehicular Convoying. These improved Semi-Autonomous Vehicular Convoying Systems enable vehicles to follow closely together in a safe, efficient, convenient manner.

SUMMARY

To achieve the foregoing and in accordance with the present invention, systems and methods for Semi-Autonomous Vehicular Convoying are provided. In particular the systems and methods for 1) A close following distance to save significant fuel, 2) Safety in the event of emergency maneuvers by the leading vehicle, 3) Safety in the event of component failures in the system, 4) An efficient mechanism for vehicles to find a partner vehicle to follow or be followed by, 5) An intelligent ordering of the vehicles based on several criteria, 6) Other fuel economy optimizations made possible by the dose following, 7) Control algorithms to ensure smooth, comfortable, precise maintenance of the following distance, 8) Robust failsafe mechanical hardware, 9) Robust failsafe electronics and communication, 10) Other communication between the vehicles for the benefit of the driver, 11) Prevention of other types of accidents unrelated to the close following mode, 12) A simpler system to enable a vehicle to serve as a leading vehicle without the full system.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for Semi-Autonomous Vehicular Convoying. Such a system enables vehicles to follow closely behind each other, in a convenient, safe manner.

Figure 1:
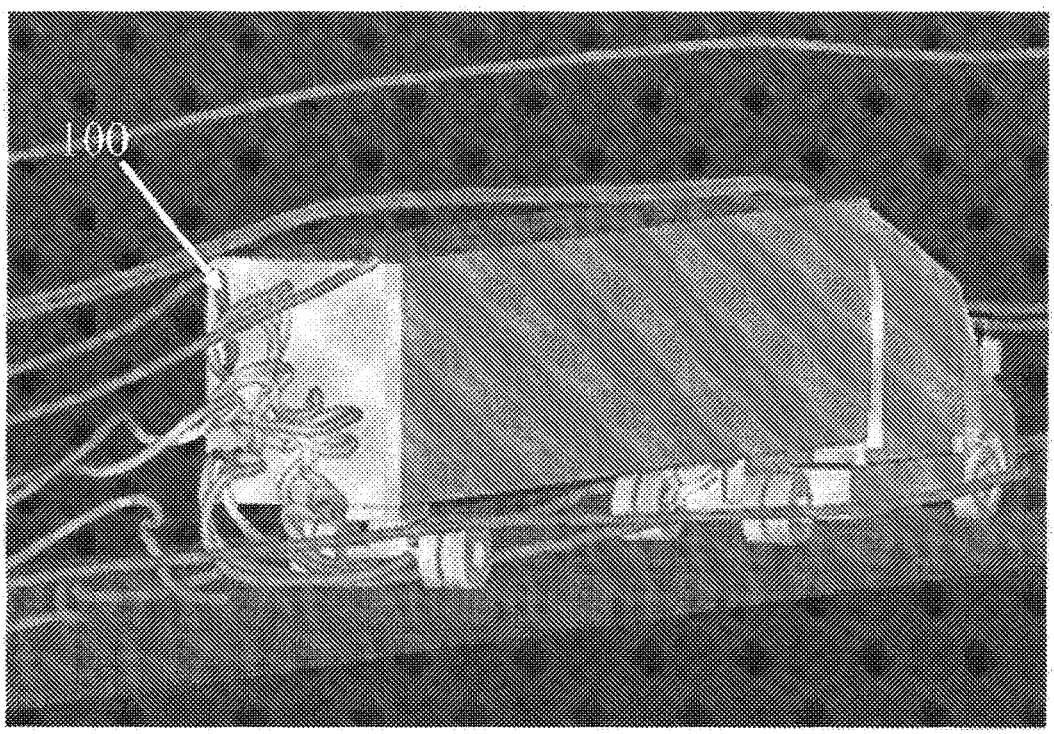
FIG. 1 shows the airflow around a heavy truck.
Figure 2:
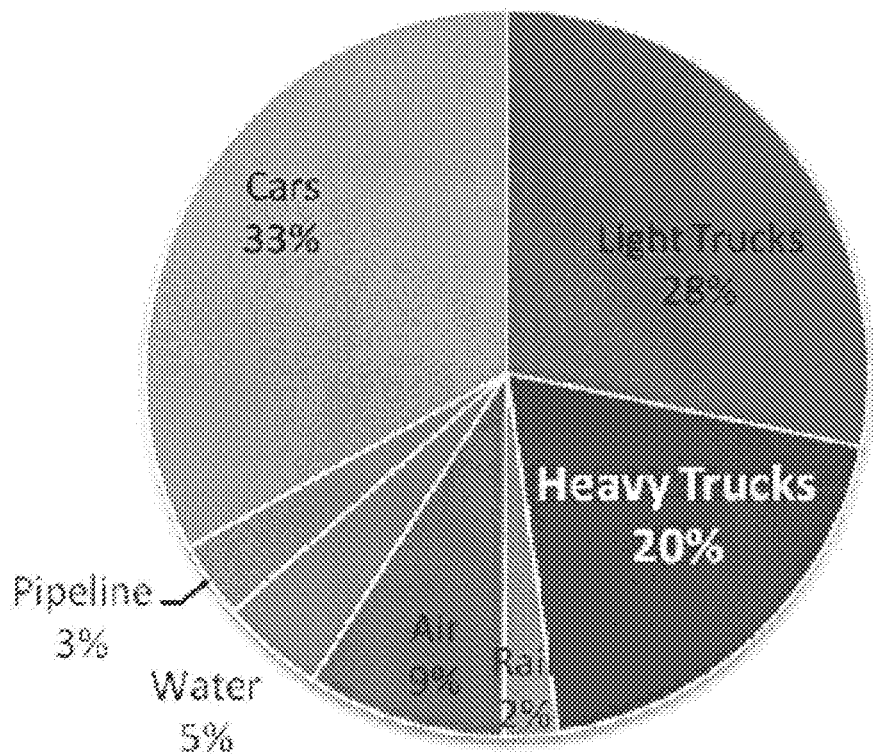
FIG. 2 shows US transportation fuel use.
Figure 3A:
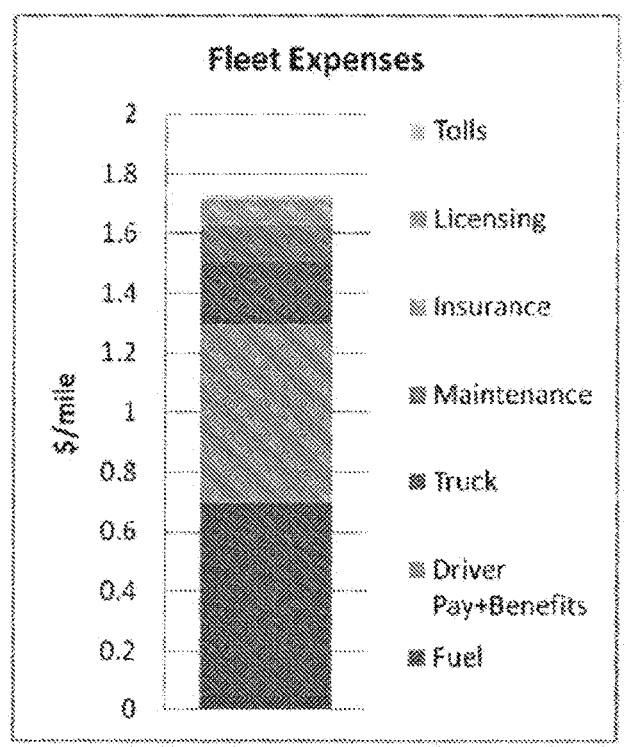
FIG. 3A shows typical fleet expenses for a heavy truck fleet.
Figure 3B:
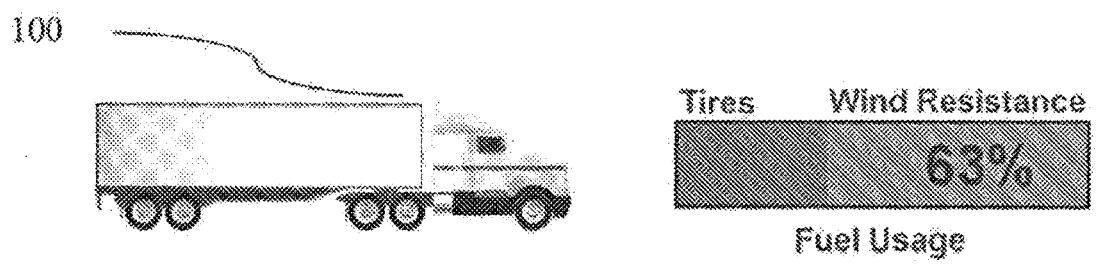
FIG. 3B shows typical heavy truck fuel use contribution from wind resistance (aerodynamic drag).

To facilitate discussion, FIG. 1 shows the airflow around a typical truck 100. This system is aimed at reducing the drag caused by this type of airflow. This drag causes the majority of fuel used in transportation, especially in the Heavy Truck sector (see FIG. 2). The expense of this fuel is significant for all private and industrial vehicle users, but especially so for heavy truck fleets, where the fuel is about 40% of operating expenses (see FIG. 3A). As shown in FIG. 3B, the wind resistance for a typical truck 100 is approximately 63% of engine power at highway speeds. This wind resistance power is approximately proportional to vehicle speed, as Drag_Power=Cd*(Area*0.5*density*Velocity^3), where Cd is the coefficient of drag and is a function of the object's shape.

Figure 4:
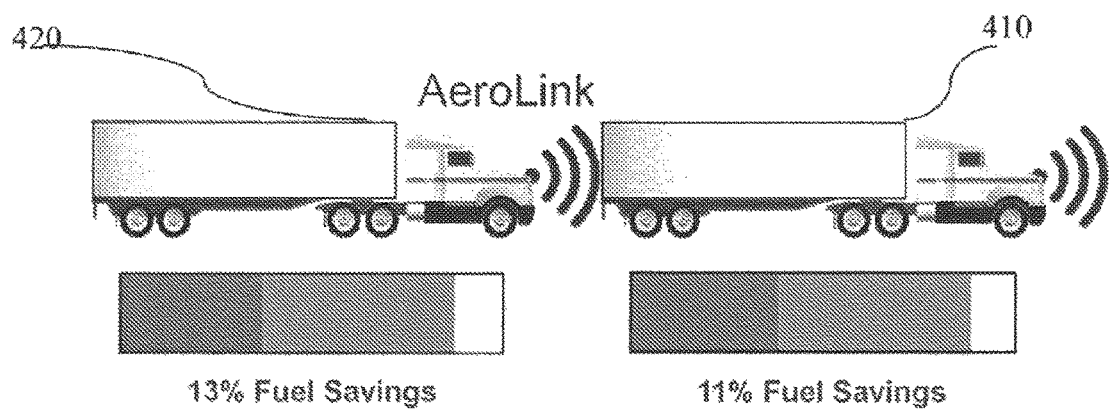
FIG. 4 shows typical fuel savings for a set of linked trucks.
Figure 5:
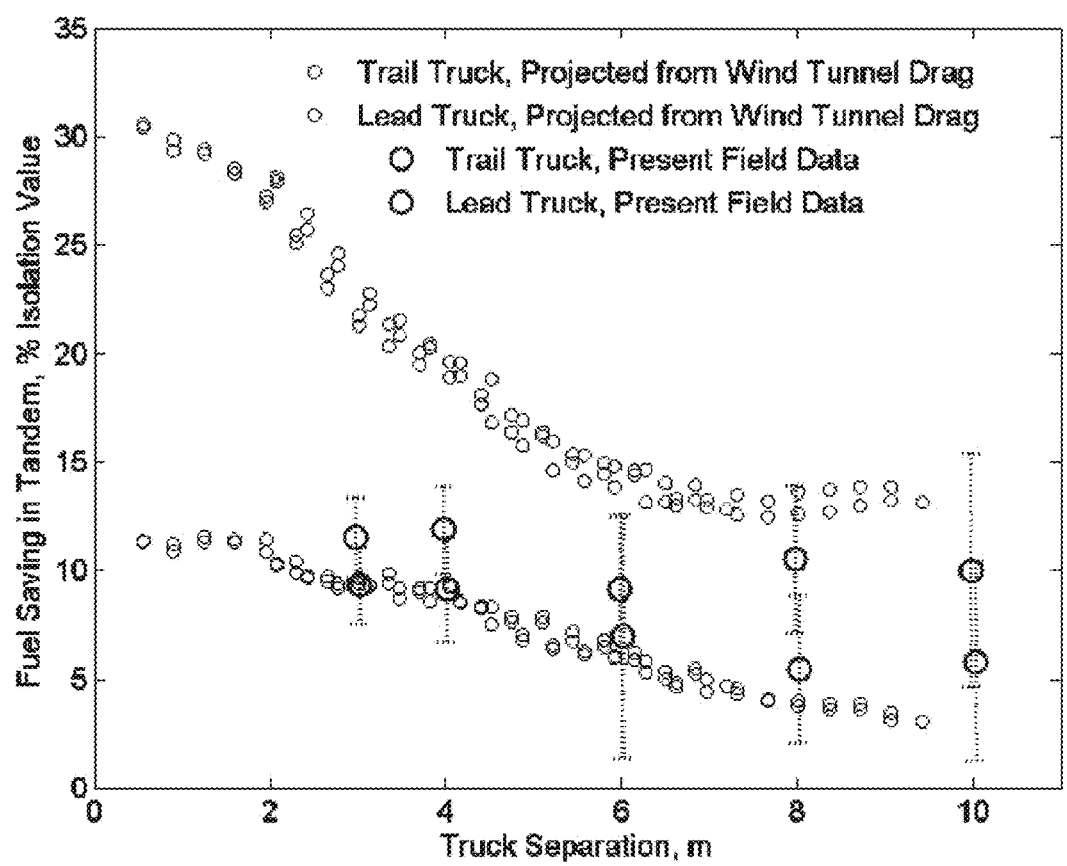
FIG. 5 shows fuel savings versus following distance gap for a set of heavy trucks.

Embodiments of the present invention enable vehicles to follow closely together. FIG. 5 (from "Development and Evaluation of Selected Mobility Applications for VII (a.k.a. IntelliDrive)", Shladover 2009) shows the fuel savings possible for heavy trucks at various gaps, while FIG. 4 shows one specific example of heavy trucks following closely.

Figure 6:
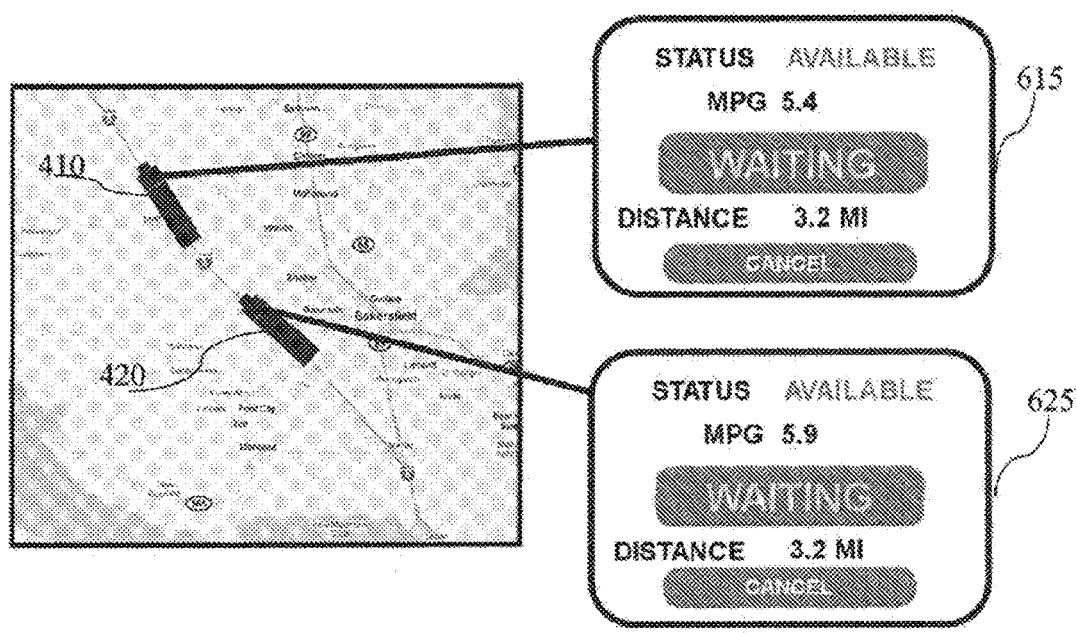
FIG. 6 shows an example of long range coordination functionality between two trucks in accordance with one embodiment of the present invention.

In accordance with the present invention, a key part of the functionality of one such embodiment is long range coordination between the vehicles. Shown in FIG. 6, this serves to allow vehicles 410 and 420 to find linking partners. The system has some knowledge of the location and/or destination of the self-vehicle and of other equipped vehicles on the road. The system can thus suggest nearby vehicles with which to link.

Figure 8:
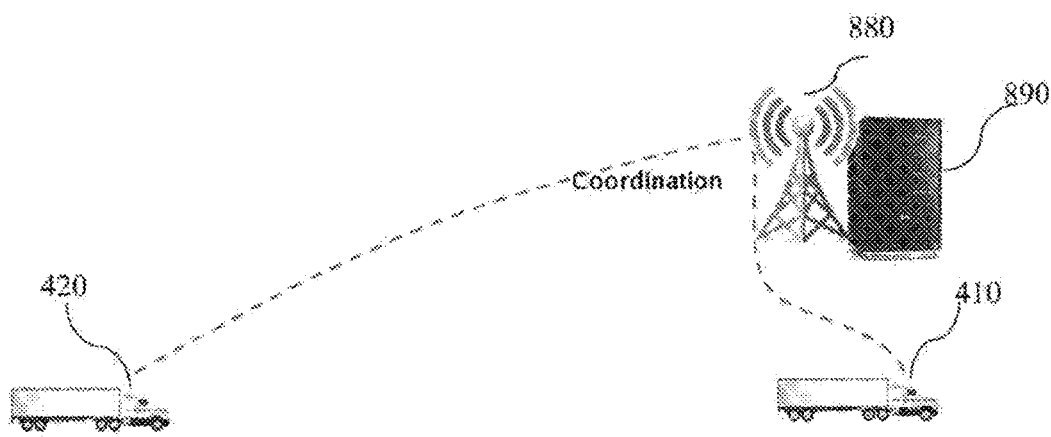
FIG. 8 illustrates an exemplary long range coordination system for long range communications between trucks.

FIG. 8 shows the technology to enable such a system: a long range communication system 880 and a central server 890. The server 890 and/or the system onboard each vehicle makes decisions and suggestions based on knowledge of one or more of vehicle location, destination, load, weather, traffic conditions, vehicle type, trailer type, recent history of linking, fuel price, driver history, or others. When a linking opportunity presents itself, the driver is notified, and can manually adjust his speed to reduce the distance between the vehicles, or the system can automatically adjust the speed.

These linking opportunities can also be determined while the vehicle is stationary, such as at a truck stop, rest stop, weigh station, warehouse, depot, etc. They can also be calculated ahead of time by the fleet manager. They may be scheduled at time of departure, or hours or days ahead of time, or may be found ad-hoc while on the road, with or without the assistance of the coordination functionality of the system.

The determination of which vehicle to suggest may take into account several factors, and choose an optimum such as the vehicle which minimizes a cost function. For example, it may minimize a weighted cost function of the distance between the vehicles and the distance between their destinations: Optimum=min($W_p(Pos_a-Pos_b)^2+W_d(Des_a-Des_b)^2$), where $W_p$ and $W_d$ are the weights on the two cost terms respectively. This cost function could have any of the factors listed above.

Once the two vehicles have decided to coordinate, they may manually adjust their speed, or it may be automatic. If manual, the system may suggest to the leader to slow down, and to the follower to speed up. Or if the leader is stationary (at a truck stop, rest stop, etc.), it may suggest that he delay his departure the appropriate amount of time. These suggestions may be based on vehicle speed, destination, driver history, or other factors. If the system automatically controls the speed, it may operate the truck in a Cruise Control or Adaptive Cruise Control type mode, with the speed chosen to bring the two vehicles closer together. The system may also operate in a semi-automatic mode, where it limits the speed of the leading vehicle, to bring them closer together.

Figure 7:
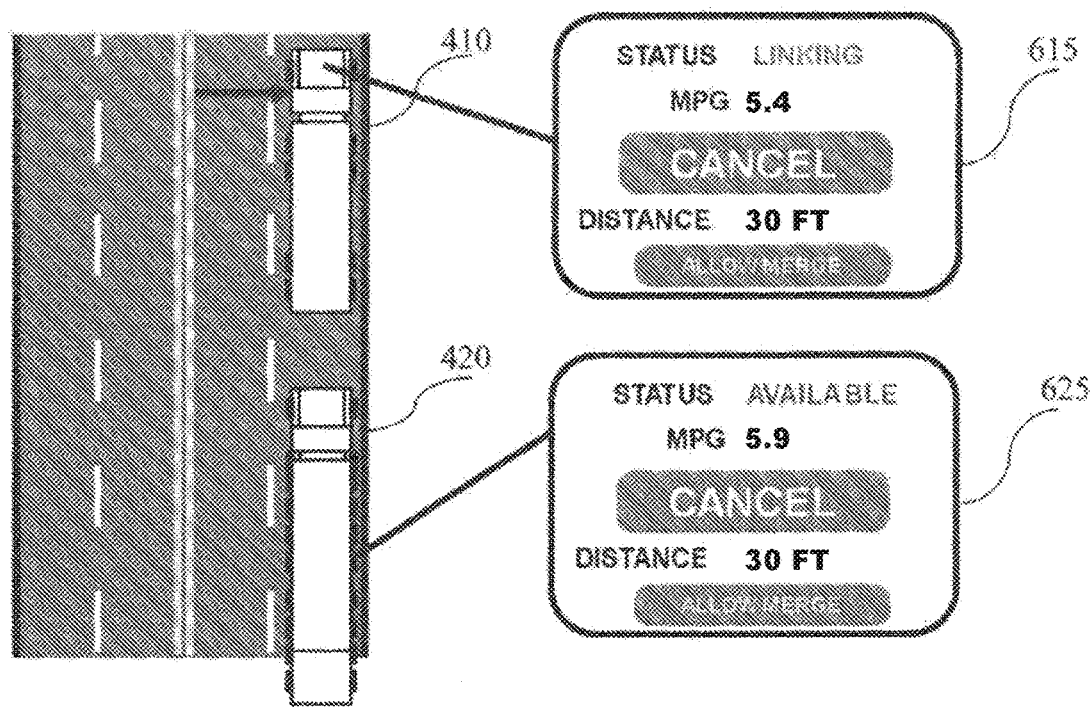
FIG. 7 shows an example of short range linking functionality between two trucks.
Figure 9:
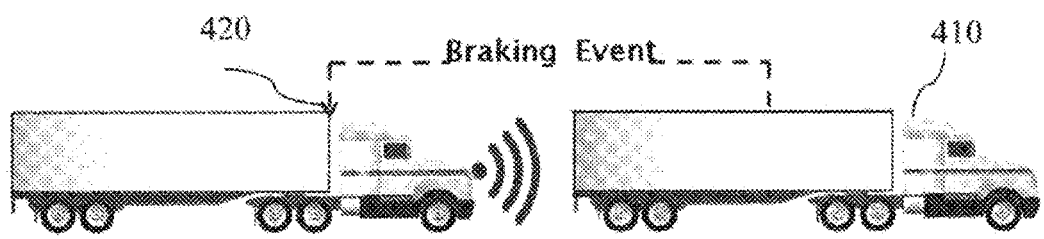
FIG. 9 illustrates exemplary short range communications between trucks.
Figure 10:
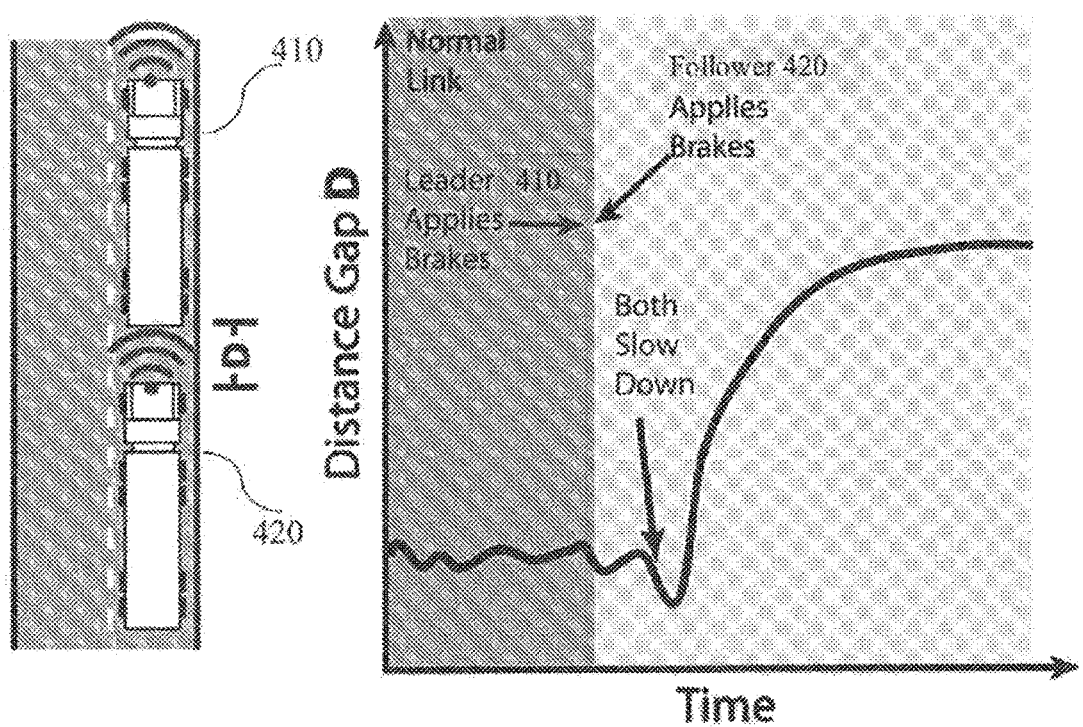
FIG. 10 illustrates an exemplary purpose and utility behind the short range communications between trucks.

Once the vehicles are close together, the system takes control of the rear vehicle 420 and controls it to a close following distance behind the front vehicle 410 (FIG. 7). The driver may use an input of the system (such as the GUI) to activate this transition, or it can be automatic based upon distance between the two vehicles. The key technology to allow this link is shown in FIG. 9, consisting primarily of a distance/relative speed sensor, and a communication link. The type of functionality of this link is shown in FIG. 10, where information about a braking event is sent from the front vehicle 410 to the rear vehicle 420. Other information may include accelerometer data (filtered or unfiltered), tire pressure, information about obstacles or other vehicles in front of the lead truck. Also, any of the above data may be passed from the front truck 410 to the rear truck 420 that relates to trucks in front of the pair (for example, to allow safe platoons of 3 or more trucks). During the close-following mode, the system controls the engine torque and braking, with no driver intervention required. The driver is still steering the vehicle.

The linking event may consist of a smooth transition to the close distance following. This may take the form of a smooth target trajectory, with a controller that tries to follow this trajectory. Using Dm as the safe relative distance in manual mode, and Da as the desired distance in semi-autonomous following mode, and a time Tt for the transition to occur, the target distance may be $D_g=D_m+(D_a-D_m)*(1-\cos(pi*t/T_d))/2$ for t less than or equal to $T_d$. Thus in this way the change in gap per time is smallest at the beginning and the end of the transition, and largest in the middle, providing a smooth response. Other possible forms of this equation include exponentials, quadratics or higher powers, hyperbolic trigonometric functions, or a linear change. This shape may also be calculated dynamically, changing while the maneuver is performed based on changing conditions or other inputs.

The driver may deactivate the system in several ways. Application of the brake pedal may resume normal control, or may trigger a mode where the driver's braking is simply added to the system's braking. Applying the accelerator pedal may deactivate the system, returning to a manual mode. Other driver inputs that may trigger a system deactivation include: Turn signal application, steering inputs larger or faster than a threshold, clutch pedal application, a gear change, Jake (compression) brake application, trailer brake application, ignition key-off, and others. The driver can also deactivate the system by selecting an option on the GUI screen or other input device.

In the event of any system malfunction, including but not limited to component failures, software failures, mechanical damage, etc., the system may react in one of several safe ways. In general the trailing truck will start braking to ensure a sate gap is maintained. This braking may continue until the trailing truck has come to a complete stop, or it may continue only until a nominally safe distance is achieved (safe without automated control), or it may continue only until the malfunction has been identified. Additionally, one of several alerts may be used to notify the driver of the malfunction and subsequent action of the control system: a braking jerk, consisting of a small braking command, an audible tone, a seat vibration, a display on the GUI or other display, flashing the instrument cluster or other interior lights, increasing or decreasing engine torque momentarily, activation of the "Jake" (compression) brake, or other useful alerts.

Figure 11:
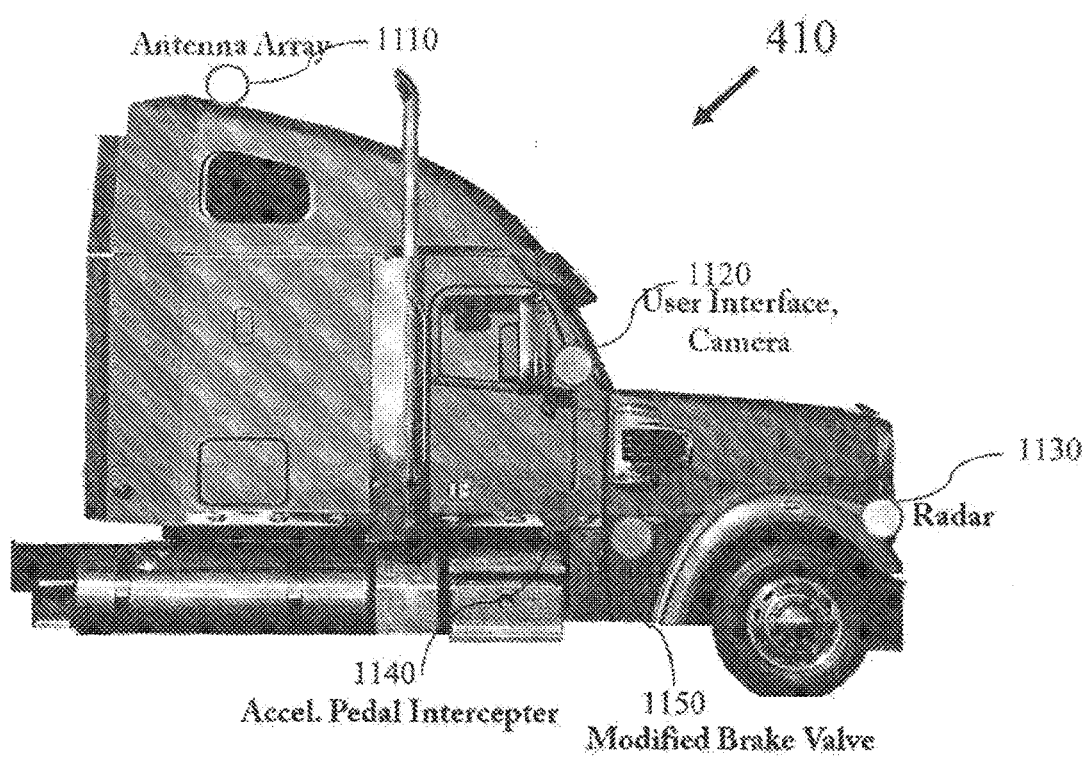
FIG. 11 shows an exemplary installation of system components for one embodiment of the invention.

To enable some or all of the described functionality, the system may have some or all of the following components shown in FIG. 11: An accelerator pedal interceptor 1140, either on the vehicle bus or as a set of analog voltages, to be used to command torque from the engine. A modified brake valve 1150, which allows the system to command braking even in the absence of driver command. A forward-looking RADAR or LIDAR unit 1130, which senses distance and relative speed of the vehicle in front 410. A dash mounted user interface 1120, which may also house a forward looking camera, which is used for the driver to interact with and control the system. An antenna array 1110, used for the short and long range communication systems, and for a GPS receiver.

Figure 12:
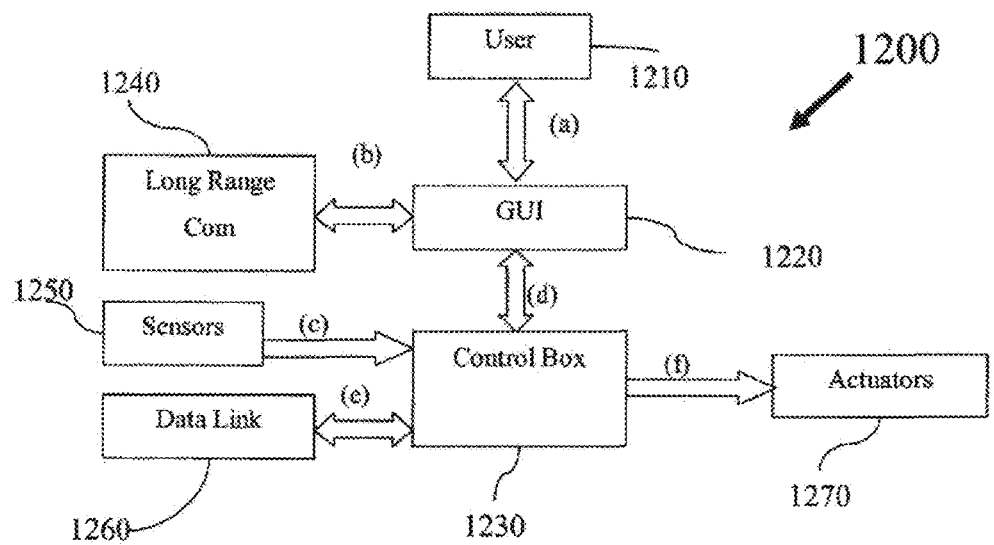
FIG. 12 is a simplified system block diagram illustrating one embodiment of the vehicular convoying control system in accordance with an embodiment of the present invention.

FIG. 12 shows the system architecture for one embodiment 1200. The user 1210 interacts with the system through a Graphical User interface box 1220 (which may alternatively be integrated with the control box 1230). The user 1210 receives information (a) from visual and or auditory alerts, and can make system requests (e.g., for linking or coordination). The GUI box 1220 communicates with a long range data link 1240 (b). The GUI box 1220 is responsible for managing this data link, sending data via the link, and receiving data via the link. A control box 1230 (which may be alternatively integrated with the GUI box) receives sensor information 1250 (c), short range data link 1260 information (e), and controls the actuators 1270 (f). It receives information from the GUI 1220 via a wired or wireless link (d), and sends information to the GUI 1220 to be relayed to the driver and/or long range communication link 1240. Alternately, the long range communication link 1240 may connect to the control box 1230. In this case, the GUI box 1220 may be an extremely simple (low cost) device, or may even be eliminated from the system entirely.

Figure 13:
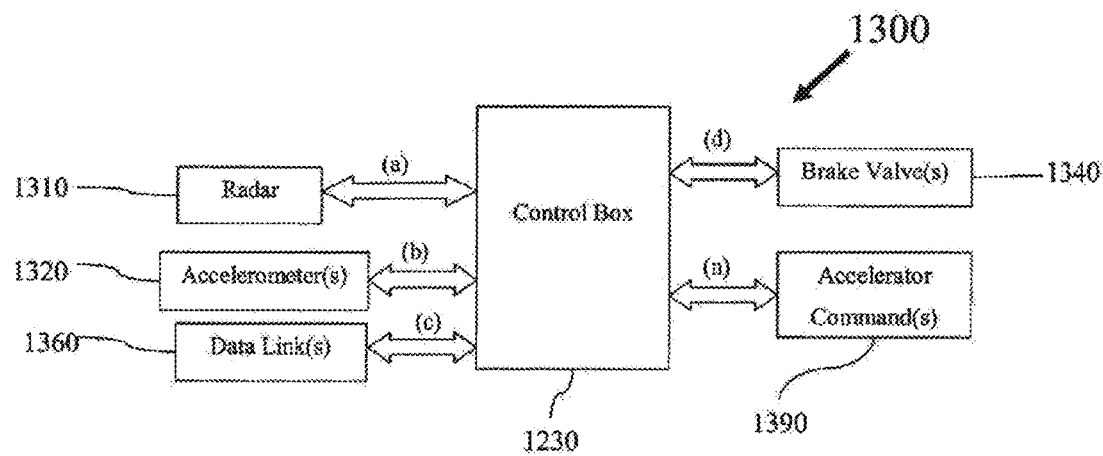
FIG. 13 is a control box block diagram illustrating one embodiment of the vehicular convoying control system in accordance with an embodiment of the present invention.

FIG. 13 shows one embodiment of the Control Box 1230, with the core sensors and actuators. Via connection (a), typically a CAN interface, the control box 1230 configures the radar unit 1310 and receives data. Connection (b) gives the control box acceleration information in 2 or 3 axes. The data link (c) provides information about a leading truck's 410 acceleration, or is used to provide that same information to a following truck 420. The brake valve 1340 (d) provides data on brake pressure, and is used to apply pressure via a command from the control box 1230. The accelerator command 1390 is sent via an analog voltage or a communications signal (CAN or otherwise). The control box performs calculations to process the sensor information, information from the GUI, and any other data sources, and determine the correct set of actuator commands to attain the current goal (example: maintaining a constant following distance to the preceding vehicle).

Figure 15:
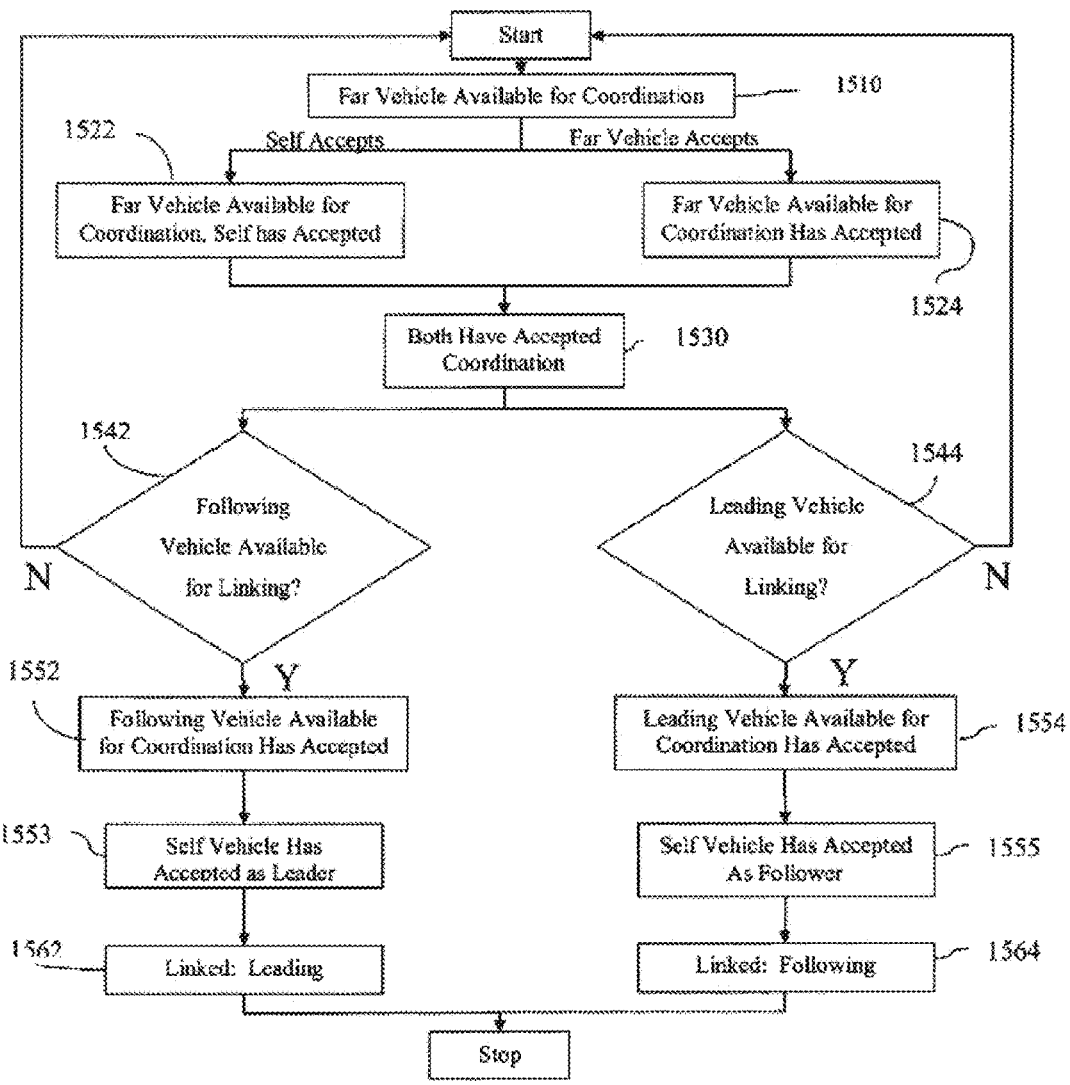
FIG. 15 shows an exemplary flowchart for coordination and linking functionality.

FIG. 15 shows one embodiment of the coordination and linking functionality. First the system identifies a vehicle available for coordination 1510 (example: within a certain range, depending on the route of the two vehicles). Once one of the vehicles has accepted 1522 or 1524, the other can then accept, meaning that the pair has agreed to coordinate for possible linking 1530. Depending on vehicle positioning, weight of load, vehicle equipment, and other factors, a vehicle within linking range may be identified as a Following Vehicle Available for Linking 1542 or a Leading Vehicle Available for Linking 1544. If neither of these is the case, the system returns to coordination mode. Once a Following Vehicle Available for Coordination has Accepted the link 1552, the Self Vehicle then also accept the link 1553, initiating the link. Upon completion of the link the vehicles are now linked 1562. Similarly, once a Leading Vehicle Available for Coordination has Accepted the link 1554, the Self Vehicle then also accept the link 1555, initiating the link. Upon completion of the link the vehicles are now linked 1564.

Safety in the event of emergency maneuvers by the leading vehicle 410 is ensured by the use of the communication link between the two vehicles. This link may send some or all of the following: brake application pressure, brake air supply reservoir pressure, engine torque, engine RPM, compression (Jake) brake application, accelerator pedal position, engine manifold pressure, computed delivered torque, vehicle speed, system faults, battery voltage, and radar/lidar data.

The data link 1260 has very low latency (approximately 10 ms in one embodiment), and high reliability. This could be, but is not limited to, WiFi, radio modem, Zigbee, or other industry standard format. This link could also be a non-industry-standard format. In the event of a data link loss, the trailing vehicles should immediately start slowing, to ensure that if the front vehicle happens to brake immediately when the link is lost, the gap can be maintained safely.

In addition to sate operation during the loss of the data link 1260, the system should be safe in the event of failure of components of the system. For most failures, the trailing vehicles 420 start braking, until the driver takes control. This ensures that in the worst case where the front vehicle 410 starts to brake immediately when a system component fails, the system is still safe. The modified brake valve 1340 is also designed such that in the event of a complete failure, the driver can still brake the vehicle.

Ordering of the vehicles: The system arranges the vehicles on the road to ensure safety. This order may be determined by vehicle weight/load, weather/road conditions, fuel savings or linking time accrued, braking technology on the vehicle, destination or other factors. The system will (graphically or otherwise) tell the drivers which vehicle should be in the front. For example, to mitigate fatigue, the system may cause the trucks to exchange positions on a periodic basis.

Figure 16:
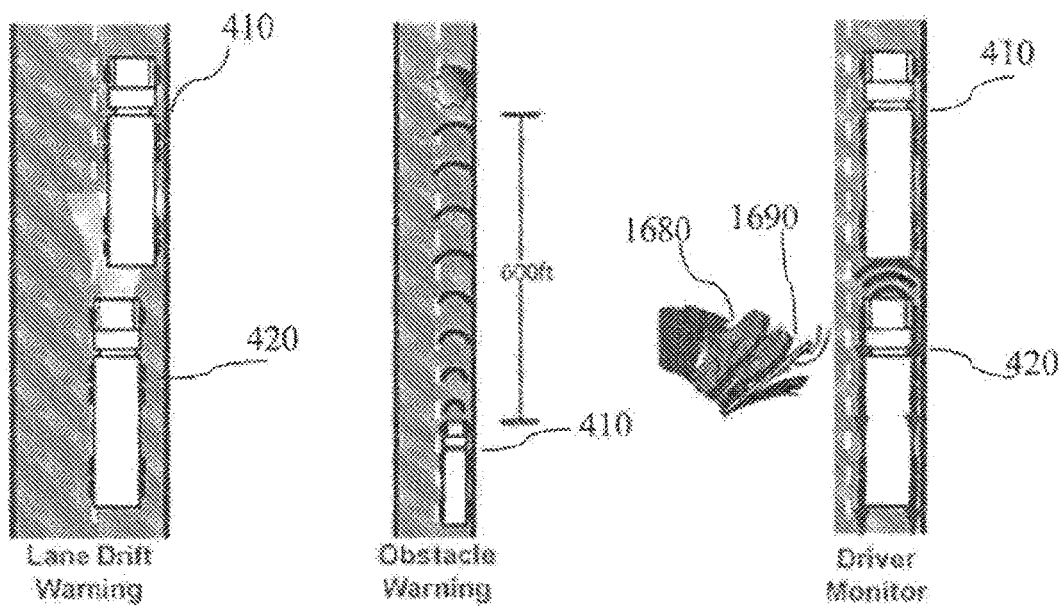
FIG. 16 shows some additional safety features for some embodiments.
Figure 17:
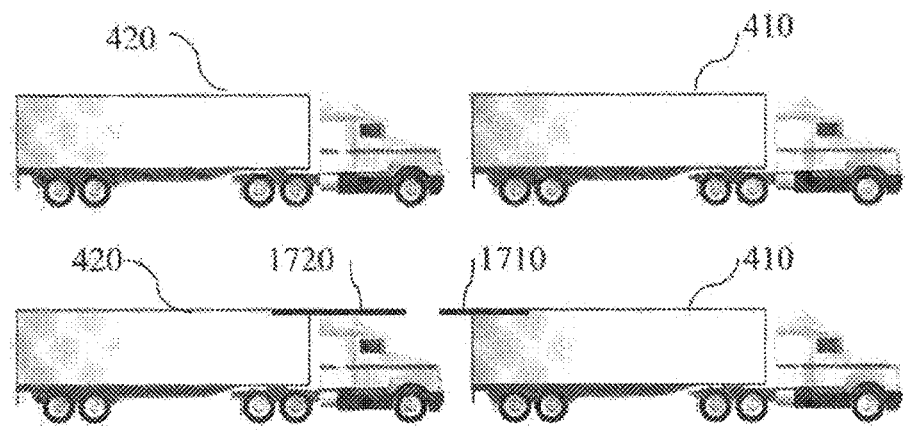
FIG. 17 shows one exemplary embodiment of simplified aerodynamic optimization for use with convoying vehicles.

FIG. 16 shows some additional safety features the system may have to prevent other types of accidents unrelated to the close following mode. One such feature is to use the video stream from the front looking camera to detect drifting within or out of the lane. This is done by looking at the edges or important features on the leading vehicle 410, and calculating the lateral offset from that vehicle. When it is detected, the system can react with a braking jerk (a short braking application to get the driver's attention), slowing down, or a braking jerk in the leading vehicle. The system can also use the front mounted radar to detect obstacles or stationary vehicles in the road, even when not in close-following mode. When these are detected, it can apply a braking jerk, slow the vehicle, or provide visual or auditory warnings. The system can also use the accelerator pedal signal to determine when the driver is not engaged with the vehicle (or other driver states) and react accordingly, such as slowing the vehicle or disabling the system.

Figure 14:
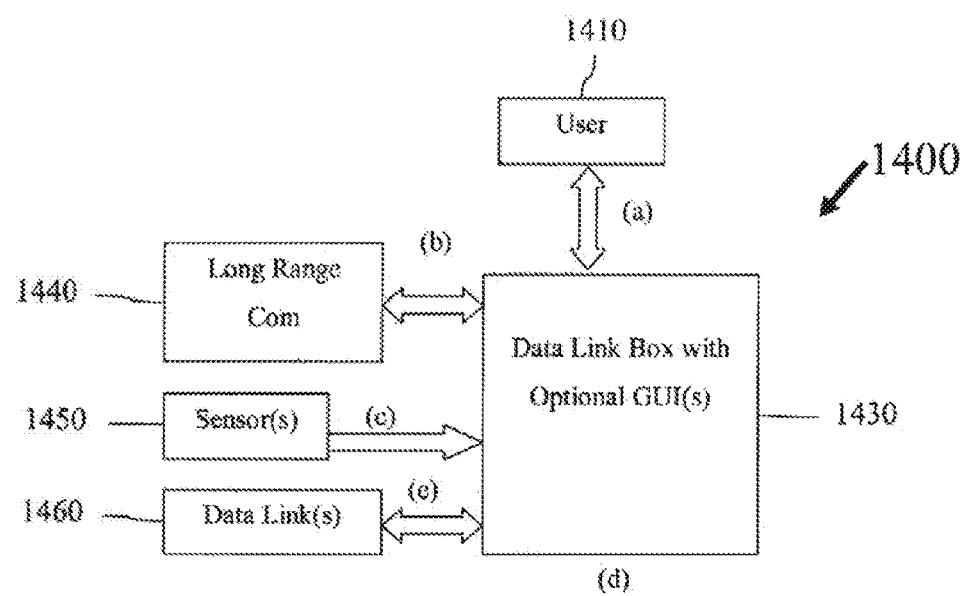
FIG. 14 shows exemplary components for a simplified version of system of the embodiment of FIG. 12 suitable for a lead vehicle.

To facilitate rapid deployment, a simpler version of the system enables vehicles to be a leading vehicle, shown in FIG. 14. The components on this version are a subset of those on the full system, so there is no automation. There are several embodiments of this reduced set of functionality, with different subsets of the components from the full system. One minimal system simply performs two functions: transmits sufficient data to the trailing vehicle to allow close following, and alerts the front driver to a linking request and allows him/her to accept or decline it. As such, this version has only the data link functionality 1460. It connects to the brake pressure sensor and electrical power. This system may also have additional components, including an accelerometer 1450 and/or an extremely simple user interface and/or long range data communication 1440.

The full system may also provide other fuel economy optimizations. These may include grade-based cruise control, where the speed set-point is determined in part by the grade angle of the road and the upcoming road. The system can also set the speed of the vehicles to attain a specific fuel economy, given constraints on arrival time. Displaying the optimum transmission gear for the driver 1410 can also provide fuel economy benefits.

The system may also suggest an optimal lateral positioning of the trucks, to increase the fuel savings. For example, with a cross wind, it may be preferable to have a slight offset between the trucks, such that the trailing truck is not aligned perfectly behind the leading truck. This lateral position may be some combination of a relative position to the surrounding truck(s) or other vehicles, position within the lane, and global position.

The data link between the two vehicles is critical to safety, so the safety critical data on this link has priority over any other data. Thus the link can be separated into a safety layer (top priority) and a convenience layer (lower priority). The critical priority data is that which is used to actively control the trailing vehicle. Examples of this may include acceleration information, braking information, system activation/deactivation, system faults, range or relative speed, or other data streams related to vehicle control.

The lower priority convenience portion of the link can be used to provide data to the driver to increase his pleasure of driving. This can include social interaction with the other drivers, video from the front vehicle's camera to provide a view of the road ahead. This link can also be used when the vehicle is stationary to output diagnostic information gathered while the vehicle was driving.

Because the system is tracking the movements of the vehicles, a tremendous amount of data about the fleet is available. This information can be processed to provide analysis of fleet logistics, individual driver performance, vehicle performance or fuel economy, backhaul opportunities, or others.

The system will have an "allow to merge" button to be used when the driver wants another vehicle to be able to merge in between the two vehicles. The button will trigger an increase in the vehicle gap to a normal following distance, followed by an automatic resumption of the close following distance once the merging vehicle has left. The length of this gap may be determined by the speed of the vehicles, the current gap, an identification of the vehicle that wishes to merge, the road type, and other factors. The transition to and from this gap may have a smooth shape similar to that used for the original linking event. Using Dv as the relative distance to allow a vehicle to cut in, and Da as the desired distance in semi-autonomous following mode, and a time Tt for the transition to occur, the target distance may be $D_g=D_a+(D_v-D_a)*(1-\cos(pi*t/T_d))2$ for t less than or equal to $T_d$.

For vehicles with an automatic transmission, the system can sense the application of the clutch pedal by inferring such from the engine speed and vehicle speed. If the ratio is not close to one of the transmission ratios of the vehicle, then the clutch pedal is applied or the vehicle is in neutral. In this event the system should be disengaged, because the system no longer has the ability to control torque to the drive wheels. For example this calculation may be performed as a series of binary checks, one for each gear: Gear_=abs(RPM/WheelSpeed−Gear1Ratio)<Gear1Threshold and so on for each gear. Thus if none of these are true, the clutch pedal is engaged.

The system can estimate the mass of the vehicle to take into account changes in load from cargo. The system uses the engine torque and measured acceleration to estimate the mass. In simplest form, this says that M total=Force_Wheels/Acceleration. This may also be combined with various smoothing algorithms to reject noise, including Kalman filtering, Luenberger observers, and others. This estimate is then used in the control of the vehicle for the trajectory generation, system fail-safes, the tracking controller, and to decide when full braking power is needed. The mass is also used to help determine the order of the vehicles on the road.

Many modifications and additions to the embodiments described above are possible and are within the scope of the present invention. For example, the system may also include the capability to have passenger cars or light trucks following heavy trucks. This capability may be built in at the factory to the passenger cars and light trucks, or could be a subset of the components and functionality described here, e.g., as an aftermarket product.

The system may also include an aerodynamic design optimized for the purpose of convoying, as shown in FIG.

17. This may be the design of the tractor or trailer, or the design of add-on aerodynamic aids that optimize the airflow for the convoy mode. This design may correspond to a specific speed, at which airflow will be optimized for the convoy mode.

For example, a hood may deploy, e.g., slide forward, from the roof of the follower vehicle. Portions of the hood may be textured (like an aerodynamic golf ball surface) or may be transparent so as not to further obscure the follower driver's view. In another example, the existing aerodynamic cone of a follower truck may be repositioned, and/or the cone profile dynamically reconfigured, depending on vehicular speed and weather conditions. This aerodynamic addition or modification may be on the top, bottom, sides, front, or back of the trailer or tractor, or a combination thereof.

This aerodynamic design may be to specifically function as a lead vehicle 1710, specifically as a following vehicle 1720, or an optimized combination of the two. It may also be adjustable in some way, either automatically or manually, to convert between optimized configurations to be a lead vehicle, a following vehicle, both, or to be optimized for solitary travel.

The data link between the two vehicles may be accomplished in one of several ways, including, but not limited to: a standard patch antenna, a fixed directional antenna, a steerable phased-array antenna, an under-tractor antenna, an optical link from the tractor, an optical link using one or more brake lights as sender or receiver, or others.

The data link, or other components of the system, may be able to activate the brake lights, in the presence or absence of brake pedal or brake application.

Other possible modifications include supplemental visual aids for drivers of follower vehicles, including optical devices such as mirrors and periscopes, to enable follower drivers to get a better forward-looking view, which is partially obscured by the lead vehicle.

Any portion of the above-described components included in the system may be in the cab, in the trailer, in each trailer of a multi-trailer configuration, or a combination of these locations.

The components may be provided as an add-on system to an existing truck, or some or all of them may be included from the factory. Some of the components may also be from existing systems already installed in the truck from the factory or as an aftermarket system.

The present invention is also intended to be applicable to current and future vehicular types and power sources. For example, the present invention is suitable for 2-wheeler, 3-wheelers, 4 wheelers, 16-wheelers, gas powered, diesel powered, two-stroke, four-stroke, turbine, electric, hybrid, and any combinations thereof. The present invention is also consistent with many innovative vehicular technologies such as hands-free user interfaces including head-up displays, speech recognition and speech synthesis, regenerative braking and multiple-axle steering.

The system may also be combined with other vehicle control systems such as Electronic Stability Control, Parking Assistance, Blind Spot Detection, Adaptive Cruise Control, Traffic Jam Assistance, Navigation, Grade-Aware Cruise Control, Automated Emergency Braking, Pedestrian detection, Rollover-Control, Anti-Jackknife control, Anti-Lock braking, Traction Control, Lane Departure Warning, Lane-keeping Assistance, and Sidewind compensation. It may also be combined with predictive engine control, using the command from the system to optimize future engine inputs.

In sum, the present invention provides systems and methods for Semi-Autonomous Vehicular Convoying. The advantages of such a system include the ability to follow closely together in a safe, efficient, convenient manner.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for commanding torque, comprising:
   receiving information about a second vehicle via a communication link between a first vehicle and the second vehicle;
   receiving information from a sensor system regarding a gap between the first vehicle and the second vehicle; and
   commanding torque of the first vehicle to maintain the gap at a predetermined value.

2. The method of claim 1, wherein the information about the second vehicle is received by a computerized controller on the first vehicle.

3. The method of claim 1, wherein the information from the sensor system is received by the computerized controller on the first vehicle.

4. The method of claim 1, wherein the torque of the first vehicle is commanded by the computerized controller on the first vehicle.

5. The method of claim 1, wherein the commanded torque is engine torque.

6. The method of claim 1, wherein commanding the engine torque of the first vehicle controls the gap.

7. The method of claim 1, wherein the predetermined value comprises gap per time.

8. The method of claim 1, wherein the communication link comprises a link that transmits and receives information between the first vehicle and the second vehicle through a third vehicle.

9. The method of claim 1, wherein the information about the second vehicle is received by an electronic device.

10. The method of claim 1, wherein the information from the sensor system is received by an electronic device.

11. The method of claim 1, wherein the gap comprises a time between the first vehicle and the second vehicle.

12. The method of claim 11, wherein the time comprises a time it will take for the second vehicle to travel a distance to reach a current location of the first vehicle.

13. The method of claim 1, wherein the gap comprises a headway.

14. The method of claim 1, wherein the torque comprises electric motor torque.

15. The method of claim 1, wherein the torque comprises power.

16. The method of claim 1, wherein the torque comprises force.

17. The method of claim 1, wherein commanding the torque causes semi-autonomous convoying between the first vehicle and the second vehicle.

18. The method of claim 1, wherein the second vehicle is chosen from a plurality of vehicles capable of linking.

19. The method of claim 1, wherein a speed of the second vehicle can be adjusted manually.

20. The method of claim 1, wherein the communication link comprises information being communicated via a server.

21. The method of claim 1, further comprising:
receiving accelerometer data; and
commanding the torque based on the accelerometer data.

22. The method of claim 1, further comprising:
receiving retarder data; and
commanding the torque based on the received retarder data.

23. The method of claim 1, further comprising:
determining the communication link was lost; and
ending the commanding of the torque of the first vehicle in response to the determination that the communication link was lost.

24. The method of claim 1, wherein the information received from the sensor system is received at a control box, and wherein the control box processes information received from the sensor system and a graphical user interface to determine actuator commands.

25. The method of claim 1, wherein receiving information about the second vehicle further comprises:
receiving information indicating the second vehicle is available for convoying; and
receiving information indicating the second vehicle has agreed to convoy.

26. The method of claim 1, wherein the first vehicle is an electric vehicle.

27. The method of claim 1, further comprising:
determining a lateral positioning of the first vehicle and the second vehicle.

28. A system for commanding torque, the system comprising:
a control unit configured to:
receive information about a second vehicle via a communication link between a first vehicle and the second vehicle;
receive information from a sensor system regarding a gap between the first vehicle and the second vehicle; and
command the torque of the first vehicle to maintain the gap at a predetermined value.

29. A system for vehicle convoying, the system comprising:
a first control unit configured to:
receive information about a second vehicle via a communication link between a first vehicle and the second vehicle; and
receive information from a sensor system regarding a gap between the first vehicle and the second vehicle; and
a second control unit configured to:
command engine torque of the first vehicle to maintain the gap at a predetermined value.

30. A system for commanding torque, the system comprising:
a first control unit configured to receive information about a second vehicle via a communication link between a first vehicle and the second vehicle;
a second control unit configured to receive information from a sensor system regarding a gap between the first vehicle and the second vehicle; and
a third control unit configured to command the torque of the first vehicle to maintain the gap at a predetermined value.

* * * * *